(12) United States Patent
Sugimoto et al.

(10) Patent No.: US 11,689,984 B2
(45) Date of Patent: Jun. 27, 2023

(54) SYSTEM AND METHOD FOR APPLYING ROUTING PROTOCOL AND SELECTING A NETWORK INTERFACE IN A MESH NETWORK

(71) Applicant: Toyota Motor North America, Inc., Plano, TX (US)

(72) Inventors: Shingo Sugimoto, Frisco, TX (US); Osamu Kawakami, Plano, TX (US)

(73) Assignee: TOYOTA MOTOR NORTH AMERICA, INC., Plano, TX (US)

(*) Notice: Subject to any disclaimer, the term of this patent is extended or adjusted under 35 U.S.C. 154(b) by 69 days.

(21) Appl. No.: 17/219,001

(22) Filed: Mar. 31, 2021

(65) Prior Publication Data
US 2022/0322201 A1    Oct. 6, 2022

(51) Int. Cl.
| | |
|---|---|
| *H04W 40/12* | (2009.01) |
| *H04W 4/46* | (2018.01) |
| *H04W 84/02* | (2009.01) |
| *H04W 40/20* | (2009.01) |

(52) U.S. Cl.
CPC ........... *H04W 40/12* (2013.01); *H04W 4/46* (2018.02); *H04W 40/20* (2013.01); *H04W 84/02* (2013.01)

(58) Field of Classification Search
CPC ....... H04W 40/12; H04W 4/46; H04W 40/20; H04W 84/02
See application file for complete search history.

(56) References Cited

U.S. PATENT DOCUMENTS

| | | |
|---|---|---|
| 7,656,901 B2 | 2/2010 | Strutt et al. |
| 9,113,352 B2 | 8/2015 | Agarwal et al. |
| 9,160,629 B1 | 10/2015 | Martin et al. |
| 9,439,121 B2 | 9/2016 | Barreto De Miranda Sargento et al. |
| 9,603,158 B1 | 3/2017 | Ross et al. |
| 9,973,960 B2 | 5/2018 | Rangaswamy et al. |
| 10,708,846 B2* | 7/2020 | Rasanen ............... H04W 28/24 |

(Continued)

FOREIGN PATENT DOCUMENTS

| | | |
|---|---|---|
| CN | 2747206 Y | 12/2005 |
| JP | 2567569 Y2 | 4/1998 |

(Continued)

OTHER PUBLICATIONS

Miariem Thaalbi, et al. 'An enhanced routing protocol for 802.11s-LTE communications'. Oct. 15, 2013. VDE. Ilmenau, Germany.

(Continued)

*Primary Examiner* — Chandrahas B Patel
(74) *Attorney, Agent, or Firm* — Dinsmore & Shohl LLP

(57) ABSTRACT

A mesh network system includes an electronic control unit. The electronic control unit is configured to calculate a plurality of radio metric scores for a plurality of network interfaces for a first vehicle of a plurality of vehicles of a mesh network as a function of radio metrics in a current motion state of the first vehicle. The radio metrics indicate performance of the plurality of network interfaces in the current motion state of the first vehicle. The electronic control unit is further configured to select a desired network interface from the plurality of network interfaces comprising a desired radio metric score indicative of a desired performance in the current motion state.

12 Claims, 4 Drawing Sheets

(56) References Cited

U.S. PATENT DOCUMENTS

| | | | | |
|---|---|---|---|---|
| 11,006,282 B2* | 5/2021 | Magzimof | ........ | H04W 28/0226 |
| 11,042,153 B2* | 6/2021 | Gogna | ............... | G01C 21/3453 |
| 11,234,243 B2* | 1/2022 | Gidvani | ............. | H04W 72/121 |

FOREIGN PATENT DOCUMENTS

| | | |
|---|---|---|
| JP | H10238053 A | 9/1998 |
| KR | 102008367 B1 | 8/2019 |
| WO | 2020081650 A1 | 4/2020 |

OTHER PUBLICATIONS

Abdulaziz M. Ghaleb, et al. 'Analysis of WLAN-LTE Interworking Paradigm for Next Generation Heterogeneous Networks'. Jan. 13, 2015. Qatar.

802.11ax vs LTE : Key features and Not just 4X Throughput. Sep. 26, 2017.

W. Steven Conner, et al. 'Overview of the Amendment for Wireless Local Area Mesh Networking'. Nov. 13, 2006.

Hidenori Aoki, et al. IEEE 802.11s Wireless LAN Mesh Network Technology. NTT DoCoMo Technical Journal vol. 8 No. 2 Feb. 25, 2009.

* cited by examiner

SYSTEM AND METHOD FOR APPLYING ROUTING PROTOCOL AND SELECTING A NETWORK INTERFACE IN A MESH NETWORK

TECHNICAL FIELD

The present specification generally relates to mesh networks between vehicles and, more specifically, the present disclosure provides systems and methods for selection of a network interface device for communications between nodes of a mesh network.

BACKGROUND

Communication functionality between vehicles, the internet, and other data sources is an ever-increasing requirement for vehicles. Communication functionality enables a vehicle to share information, such as sensor information, receive and transmit system updates, navigation information, and the like. For example, when a vehicle requires an update, a vehicle connects to the internet and receives the update from an internet based data source, such as a server. Additionally, vehicles may be configured to establish peer-to-peer networks, generally referred to as vehicle-to-vehicle communication (V2V). These networks may be established based on proximity of vehicles to each other and/or strength of signal. However, the network connections may be transient as vehicles change speed, direction of travel or the like. Without the ability to establish less transient network connections, the effectiveness of operations, such as edge computing between vehicles or sharing updates, which can consist of large files, may not be fully utilized since the connections may periodically change.

Accordingly, there is a need for mesh networks that are more efficient, reliable, or are otherwise improved.

SUMMARY

In one embodiment, a mesh network system includes an electronic control unit. The electronic control unit is configured to calculate a plurality of radio metric scores for a plurality of network interfaces for a first vehicle of a plurality of vehicles of a mesh network as a function of radio metrics in a current motion state of the first vehicle. The radio metrics indicate performance of the plurality of network interfaces in the current motion state of the first vehicle. The electronic control unit is further configured to select a desired network interface from the plurality of network interfaces comprising a desired radio metric score indicative of a desired performance in the current motion state.

In another embodiment, a mesh network system includes a computing device. The computing device is further configured to calculate a plurality of radio metric scores for a plurality of network interfaces for a first vehicle of a plurality of vehicles of a mesh network as a function of radio metrics in a current motion state of the first vehicle. The radio metrics indicate performance of the plurality of network interfaces in the current motion state of the first vehicle. The computing device is further configured to select a desired network interface from the plurality of network interfaces comprising a desired radio metric score indicative of a desired performance in the current motion state.

In another embodiment, a method comprises calculating, by a computing device, a plurality of radio metric scores for a plurality of network interfaces for a first vehicle of a plurality of vehicles of a mesh network as a function of radio metrics in a current motion state of the first vehicle. The radio metrics indicate performance of the plurality of network interfaces in the current motion state of the first vehicle. The method may further include selecting a desired network interface from the plurality of network interfaces comprising a desired radio metric score indicative of a desired performance in the current motion state.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The embodiments disclosed herein relate to systems and methods for selecting a network interface for communication between vehicular nodes of a mesh network. The mesh networks may facilitate information sharing, edge computing, access to wide area networks, and the like among the vehicles of the mesh network. Embodiments described herein are directed to an abstraction layer within a dual carrier module of a vehicle communication unit. As described herein, the abstraction layer may be configured to utilize a Wi-Fi network interface as an equally weighted network interface to other network interfaces (e.g., Long-Term Evolution (LTE), $x^{th}$ generation cellular technology (e.g., 2G, 3G, 4G, 5G, etc.), dedicated short range communication (DSRC), vehicle to everything (V2X), cellular V2X (C-V2X), or the like) when resolving node connections for use in a communications within a mesh network.

In some traditional systems, mesh networks may employ IEEE 802.11 routing protocols which biases communications towards a Wi-Fi network interface as the interface for use in a mesh network. Wi-Fi network interfaces may not provide the optimal radio metric for the communications within the mesh network, due in part to movement of nodes, changes in speeds, location, distance to another node, interference, or the like. Accordingly, embodiments may resolve or improve network interface selection through an abstraction layer that may select a target network interfaces from available network interfaces, wherein the abstraction layer selects a desired network interface based on a radio metric that equally weights radio network interfaces such that selection does not bias towards a Wi-Fi network interface.

Figure 1:
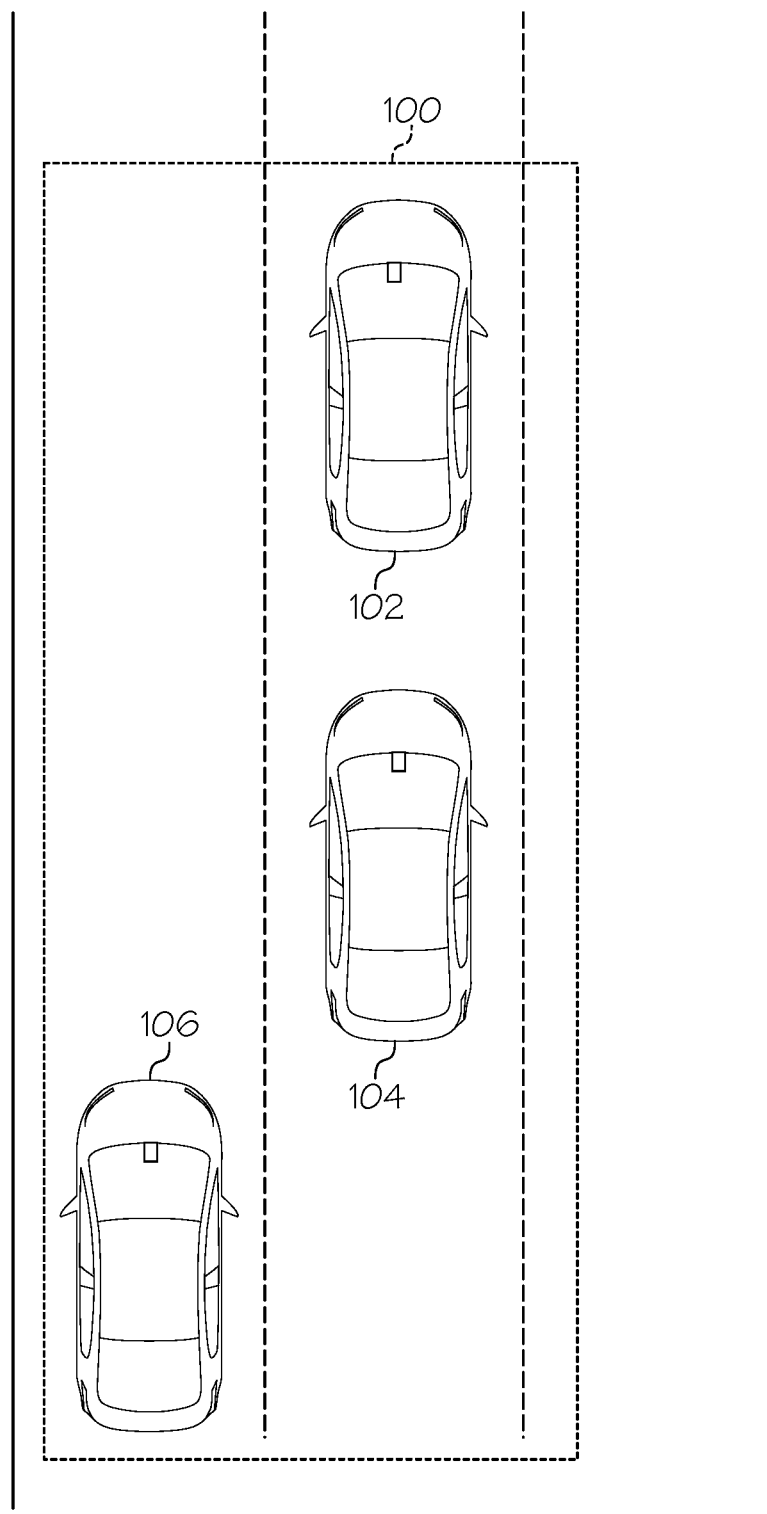
FIG. 1 depicts an illustrative embodiment of a mesh network system including vehicles and a mesh network according to one or more embodiments shown and described herein.

Turning now to the drawings wherein like numbers refer to like structures, and particularly to FIG. 1, an illustrative embodiment of a mesh network system 100 including nodes that comprise vehicles, such as a first vehicle 102, a second vehicle 104, and a third vehicle 106 traveling in the same direction along a roadway. In embodiments, a plurality of vehicles that are determined to be traveling with similar speeds, headings, proximities, destinations, or the like may be identified and grouped together via their communications units in a mesh network system 100. A communications unit may comprise one or more network interface devices, telematics units, or the like. For instance, a communications unit may include network interfaces for communicating via different access protocols, different duplexing schemes, in disparate frequency bands, etc. Such network interfaces may include Wi-Fi, $x^{th}$ generation cellular technology (e.g., 2G, 3G, 4G, 5G, etc.), WCDMA, LTE, LTE Advanced, ZigBee, Bluetooth, WiMAX, UMTS, code-division multiple access (CDMA), C-V2X, Global System for Mobile Communications (GSM), or the like.

It is noted that the first vehicle 102, the second vehicle 104, and the third vehicle 106 may be traveling in an appropriate configuration, such as a line formation, or other formation wherein the first vehicle 102, the second vehicle 104, and the third vehicle 106 are generally within a determined distance from each other. In some embodiments, the vehicles of a mesh network system 100 may be separated by other vehicles on the road or may be a predefined distance apart, but still traveling with similar speeds, headings, proximities, destinations, and/or the like. It is further noted that different numbers and types of vehicles may be utilized by or be comprised by the mesh network system 100.

The first vehicle 102, the second vehicle 104, and the third vehicle 106 may be communicatively linked to form the mesh network system 100. The mesh network system 100 may include a routing table that includes a vehicle identification (e.g., communications unit identification numbers, IP address, or other information related to the first vehicle 102, the second vehicle 104, and the third vehicle 106). A computing device (e.g., electronic control unit, etc.) of one or more of the first vehicle 102, the second vehicle 104, and the third vehicle 106, or a remote computing device may store the routing table in its memory (e.g., non-transitory computer-readable memory). Furthermore, the computing device may further determine member vehicles to be included in a mesh network system 100 based on their distance from each other, destination, speed, traveling path, or the like. These parameters may be dependent on speed and heading information or independent therefrom.

The mesh network system 100 may operate in an edge-computing environment where tasks such as navigation, autonomous environment detection and analysis, and the like may be performed by the electronic control units of the first vehicle 102, the second vehicle 104, and the third vehicle 106 that have available resources. For example, the first vehicle 102 may have an electronic control unit with advanced computing power over the second vehicle 104 and the third vehicle 106, so that the first vehicle 102 may be tasked with operations that require advanced computing resources. The second vehicle 104 may include sensor packages that are superior or positioned better with respect to their traveling relationships. Therefore, those sensor packages may be utilized over those of the first vehicle 102 and the third vehicle 106 in the mesh network system 100. As another example, the third vehicle 106 may have data or system updates that the first vehicle 102 and the second vehicle 104 in the mesh network system 100 require. Therefore, instead of each of first vehicle 102, the second vehicle 104, and the third vehicle 106 establishing a cellular connection and performing tasks independently, which may be slow and costly, the first vehicle 102, the second vehicle 104, and the third vehicle 106 in the mesh network system 100, through a network interface such as WiFi, may transmit and receive data with each other. This may reduce download times and improve the distribution of a system update as vehicles may operate as additional sources of the update as opposed to a central server connected to via a wide area network.

In embodiments described herein, a vehicle of a mesh network system 100 may be identified as a master node vehicle by a computing device of a vehicle or a remote computing device. This vehicle may receive the designation of master node vehicle based on capabilities of the vehicle, such as processing or computing resources, advanced telematics systems, or the like. This vehicle may also receive this designation based on information that it may have that other vehicles require. A master node vehicle may operate as an access point for other vehicles to connect through to access a wide area network (WAN), such as the internet. For example, some vehicles may only be equipped with near field communication interfaces such as Bluetooth or WiFi. These vehicles may be able to access WAN destinations by transmitting through a master node vehicle that is equipped with a communications unit having a long-range interface system (e.g., 4G LTE, 5G, etc.).

Figure 2:
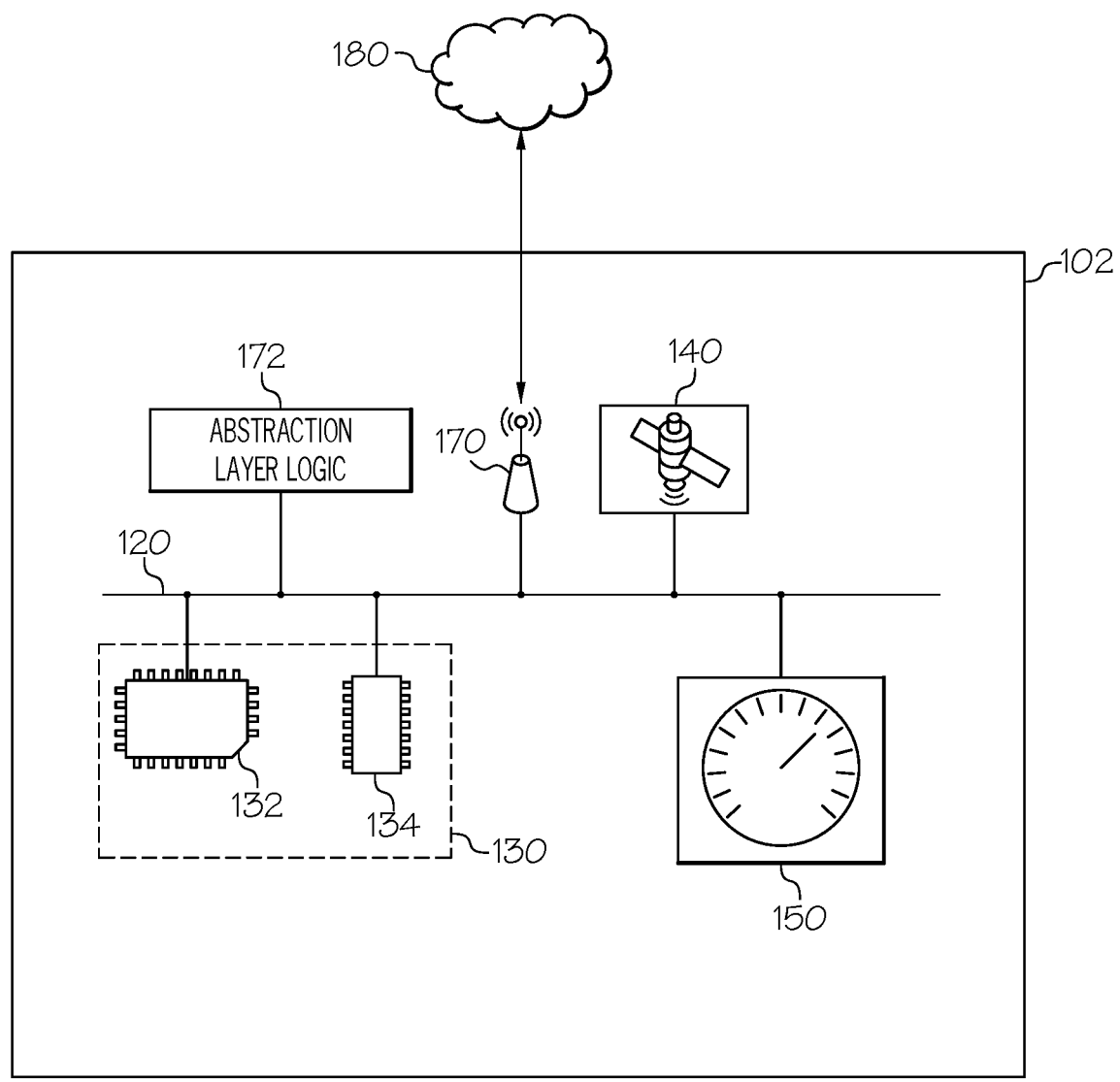
FIG. 2 schematically depicts components of a vehicle according to one or more embodiments shown and described herein.

Referring now to FIG. 2, an example schematic of a portion of the first vehicle 102 including sensor resources and a computing device is depicted. It is noted that other vehicles within the mesh network system 100 may be equipped with the same, similar, or different sets of sensor resources, telematics resources, or the like. In at least some embodiments, the first vehicle 102 may include an electronic control unit 130 comprising a processor 132 and a non-transitory computer readable memory 134, a navigation unit 140 (e.g., global positioning system (GPS), compass, etc.), a vehicle sensor(s) 150 (e.g., vehicle speed sensors, motion sensors, proximity sensors, etc.), and a communications unit 170. These and other components of the first vehicle 102 may be communicatively connected to each other via a communication bus 120.

The communication bus 120 may be formed from any medium that is capable of transmitting a signal such as, for example, conductive wires, conductive traces, optical waveguides, or the like. The communication bus 120 may also refer to the expanse in which electromagnetic radiation and their corresponding electromagnetic waves traverse. Moreover, the communication bus 120 may be formed from a combination of mediums capable of transmitting signals. In one embodiment, the communication bus 120 comprises a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. As used herein, the term "communicatively coupled" means that coupled components are capable of exchanging signals with one another such as, for example, electrical signals via conductive medium, electromagnetic signals via air, optical signals via optical waveguides, and the like.

The electronic control unit 130 may be any device or combination of components comprising a processor 132 and non-transitory computer readable memory 134. The processor 132 may be any device capable of executing the machine-readable instruction set stored in the non-transitory computer readable memory 134. Accordingly, the processor 132 may be an electric controller, an integrated circuit, a microchip, a computer, or any other computing device. The processor 132 is communicatively coupled to the other components of the vehicle 102 by the communication bus 120. Accordingly, the communication bus 120 may communicatively couple any number of processors 132 with one another, and allow the components coupled to the communication bus 120 to operate in a distributed computing environment. Specifically, each of the components may operate as a node that may send and/or receive data. While the embodiment depicted in FIG. 2 includes a single processor 132, other embodiments may include more than one processor 132.

The non-transitory computer readable memory 134 may comprise RAM, ROM, flash memories, hard drives, or any non-transitory memory device capable of storing machine-readable instructions such that the machine-readable instructions can be accessed and executed by the processor 132. The machine-readable instruction set may comprise logic or algorithm(s) written in any programming language of any generation (e.g., 1GL, 2GL, 3GL, 4GL, or 5GL) such as, for example, machine language that may be directly executed by the processor 132, or assembly language, object-oriented programming (OOP), scripting languages, microcode, etc., that may be compiled or assembled into machine readable instructions and stored in the non-transitory computer readable memory 134. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 2 includes a single non-transitory computer readable memory 134, other embodiments may include more than one memory module.

The non-transitory computer readable memory 134 may include or be in communication with an abstraction layer 172. The abstraction layer 172 may include computer readable instructions (e.g., abstraction layer logic) that, when executed by the processor 132, cause the processor 132 to provide functions of the abstraction layer 172 described herein. The abstraction layer 172 may be configured select network interfaces having a preferred or lowest calculated radio metric score for communicating between nodes of the mesh network system 100. For instance, the abstraction layer 172 may weigh Wi-Fi, LTE, 5G, DSRC, C-V2X or the like equally and select a network interface based on a radio metric alone such that no reference receives a bias. It is further noted that the abstraction layer 172 may be disposed within or comprised by one or more devices (e.g., one or more electronic control units), remote devices (e.g., severs, remote computing devices), or the like. While embodiments may refer to a vehicle as comprising the abstraction layer 172, it is noted that severs, remote computing devices, or the like may comprise the abstraction layer 172.

In an example, the radio metric may comprise an airtime metric. The airtime metric may comprise the time taken for a packeted transmission on a wireless network to be sent and received. For instance, the abstraction layer 172 may select network interfaces to be utilized by each node and routing paths between nodes based on on-demand routing using Radio Metric On-Demand Distance Vector (RM-AODV), pro-active routing, tree-based routing, or other appropriate routing technique or combination thereof. The determined path and network interface may be recorded in a routing table stored by the non-transitory computer readable memory 134 or other memory, including memory communicatively coupled through the network 180.

According to an embodiment, a node such as the first vehicle 102, may send a radio metric exchange with each connected to the sending node. The radio metric, such as airtime, quantifies the quality of a network interface connection. The first vehicle 102 may then send a request packet to each node within the mesh network system 100 via communications unit 170. Each relay node or relay electronic control unit (e.g., second vehicle 104, third vehicle 106, electronic control unit 130B, electronic control unit 130C, etc.) may add, via their own abstraction layer 172, the value of the radio metric for the upcoming wireless link to the existing value of the radio metric in the request packet such that an accumulated radio metric value may be determined. In examples, each relay node may select a network interface of available network interfaces of the communications unit 170 having a lowest radio metric value, such as lowest airtime. The relay node may then transmit, via the communications unit 170, the request packet to the next relay node. This may iterate until a destination node receives the request packet. The destination node may then determine, via its own abstraction layer 172, a route and network interface type for communications. The destination node may then transmit a response packet that may notify each relay node of the selected route and selected network interface. As identified herein, the abstraction layer 172 may thus select a network interface between nodes with the lowest radio metric value for communications between nodes, without biasing towards any one network interface.

In some embodiments, the abstraction layer 172 may be configured to selectively utilize environmental factors for selection of a network interface. It is noted that utilization of environmental factors may be determined based on a user setting (e.g., user selection of whether to utilize environmental factors), may be configured to be utilized, or may be configured not to be utilized. For instance, as the mesh network system 100 involves moving nodes (e.g., first vehicle 102, second vehicle 104, and third vehicle 106) that change in environmental factors, such as distance, location, and signal stability/strength between each other, may alter the radio metric for each type of network interface device (e.g., Wi-Fi, LTE, 5G, C-V2X) between each node. That is, some network interface devices work better than others do depending on the node's location, distance to another node, environmental factors (e.g., weather), interference from other wireless signals, an antenna type (e.g., directional antenna, omni antenna, etc.), vehicle motion, or the like. As an example, LTE and/or DSRC will generally provide more reliable communications during movement than WiFi due to robustness to Doppler Effect, etc.

According to at least some embodiments, the abstraction layer 172 may select network interfaces for communication within the mesh network system 100 in response to a triggering event. A triggering event may include passage of time (e.g., intervals, periodically, etc.), change in vehicle motion (e.g., starting, stopping, change in speed, etc.), removal or addition of a node, change to an environmental factor, or the like. It is further noted that the abstraction layer 172 may alter interval length based on vehicle motion, environmental factors, removal or addition of a node, or the like.

For example, if a vehicle sensor(s) 150 (as described in more detail herein) determines that the first vehicle 102 is stopped or moving under a threshold speed, the abstraction layer 172 may utilize a stationary time interval which may be an extended time interval (e.g., such as one minute or above) when compared to a time interval when the first vehicle 102 is moving and/or moving at a speed meeting or exceeding a threshold speed. In another example, if the first vehicle 102 is moving and/or moving at a speed meeting or exceeding a threshold speed, then the abstraction layer 172 may apply a non-stationary time interval that is a relatively shorter interval (e.g., 10 seconds, 20 seconds, etc.). It is noted that other intervals and threshold may be utilized. Moreover, the abstraction layer 172 may adjust intervals based on the proximity or distance between the vehicles within the mesh network system 100 changes, in response to a transmission exceeding a threshold amount of time (e.g., timing out), or the like.

The electronic control unit 130 may determine travel parameters such as a speed, direction of travel or heading, position, future or projected position, final destination, proximity or distance between vehicles (e.g., 1 mile, ¾ mile, ½ mile, ¼ mile, 5000 ft., 4000 ft., 3000 ft., 2000 ft., 1500 ft., 1000 ft., 500 ft., or 250 ft.), or the like based on one or more signals received from vehicle sensor(s) 150 and/or navigation unit 140. In some embodiments, the electronic control unit 130 selects vehicles to be included in the mesh network based on the travel parameters derived or received from the one or more signals from the vehicle sensor(s) 150 and/or navigation unit 140. For instance, the electronic control unit 103 (e.g., via the abstraction layer 172) and/or the computing device 192 (See FIG. 3) (via an electronic control unit or abstraction layer) identifies vehicles for and/or generates a mesh network including one or more vehicles based on: (i) a comparison of the speed of the vehicles and (ii) a comparison of the heading of the vehicles. As one example, the computing device 192 and/or the electronic control unit 130 identify one or more vehicles of the plurality of vehicles that are traveling at a speed that is less than or equal to a predetermined speed threshold of each other and have a heading that is less than or equal to a predetermined heading threshold of each other. The predetermined speed threshold may be about +/−10 miles per hour, about +/−9 miles per hour, about +/−8 miles per hour, about +/−7 miles per hour, about +/−6 miles per hour, about +/−5 miles per hour, about +/−4 miles per hour, about +/−3 miles per hour, about +/−2 miles per hour, about +/−1 miles per hour, or about +/−0.5 miles per hour. The predetermined heading threshold may be +/−10 degrees, +/−9 degrees, +/−8 degrees, +/−7 degrees, +/−6 degrees, +/−5 degrees, +/−4 degrees, +/−3 degrees, +/−2 degrees, +/−1 degrees, +/−0.5 degrees, or +/−0.25 degrees.

Accordingly, the abstraction layer 172 may select a time interval for calculating radio metric scores for each of a plurality network interfaces for the vehicles, wherein the time interval is based at least in part on a motion state of a vehicle. The abstraction layer 172 may iterate, at least at the time interval, the following calculating the radio metric scores for each of the plurality network interfaces for a first vehicle of the plurality of vehicles, selecting a desired network interface from the plurality of network interfaces based on the radio metric scores, instructing the communications unit 170 to transmit a request packet from the first vehicle 102 to the second vehicle 104 or the third vehicle 106, and receiving, via the communications unit 170, a final route and network interface type for communications. It is further noted that each electronic control unit 130B, 130C (See FIG. 3) may receive the request packets and iterate calculating radio metric scores, and sending the request packet to other relay nodes or a destination node.

Still referring to FIG. 2, a navigation unit 140 such as a GPS device, electronic compass, or the like may be coupled to the communication bus 120 and communicatively coupled to the electronic control unit 130 of the vehicle 102. The navigation unit 140 is capable of generating location information and/or heading information indicative of a location of the vehicle 102 by receiving one or more GPS signals from one or more GPS satellites. The navigation unit 140 may be configured to generate heading information, for example, based on an electronic compass. The GPS signal communicated to the electronic control unit 130 via the communication bus 120 may include location information comprising a National Marine Electronics Association (NMEA) message, a latitude and longitude data set, a street address, a name of a known location based on a location database, or the like. Additionally, the navigation unit 140 may be interchangeable with any other systems capable of generating an output indicative of a location. For example, a local positioning system that provides a location based on cellular signals and broadcast towers or a wireless signal detection device capable of triangulating a location by way of wireless signals received from one or more wireless signal antennas.

The vehicle 102 may also include a vehicle sensor(s) 150 coupled to the communication bus 120 and communicatively coupled to the electronic control unit 130. The vehicle sensor(s) 150 may be any sensor or system of sensors for generating a signal indicative of vehicle speed, movement, proximity to other vehicles, etc. For example, without limitation, a vehicle sensor(s) 150 may be a tachometer that is capable of generating a signal indicative of a rotation speed of a shaft of the vehicle 102 engine or a drive shaft. Signals generated by the vehicle sensor(s) 150 may be communicated to the electronic control unit 130 and converted to a vehicle speed value. The vehicle speed value is indicative of the speed of the vehicle 102. In some embodiments, the vehicle sensor(s) 150 comprises an opto-isolator slotted disk sensor, a Hall Effect sensor, a Doppler radar, or the like. In some embodiments, a vehicle sensor(s) 150 may comprise data from a GPS for determining the speed of a vehicle 102. The vehicle sensor(s) 150 may be provided so that the electronic control unit 130 may determine when the vehicle 102 accelerates, maintains a constant speed, slows down or is comes to a stop. For example, a vehicle sensor(s) 150 may provide signals to the electronic control unit 130 indicative of a vehicle 102 slowing down due to a change in traffic conditions or prior to the vehicle performing a turning maneuver. It is further noted that the vehicle sensor(s) 150 may determine a state of a vehicle, such as a motion state of a vehicle (e.g., whether the vehicle is moving or not moving) based on one or more factors including state of an ignition (e.g., on/off), gear (e.g., idle, driving gear), speed, traffic status and position, cruise control on/off, tracking of another vehicle, tracked vehicle status, or the like.

Still referring to FIG. 2, communications unit 170 may include a vehicle-to-vehicle communication device for communicating with other vehicles (e.g., the second vehicle 104, the third vehicle 106, etc.). The communications unit 170 may be coupled to the communication bus 120 and communicatively coupled to the electronic control unit 130. The communications unit 170 may be any device capable of transmitting and/or receiving data with a network 180 or directly with another vehicle (e.g., the second vehicle 104, the third vehicle 106) equipped with a communications unit 170. Accordingly, communications unit 170 can include a communication transceiver for sending and/or receiving any wired or wireless communication according to a network interface or protocol. For example, the communications unit 170 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, a communications unit 170 may include hardware configured to operate in accordance with the Bluetooth wireless communication protocol. In another embodiment, a communications unit 170 may include a Bluetooth send/receive module for sending and receiving Bluetooth communications to/from a network 180 and/or another vehicle.

Figure 3:
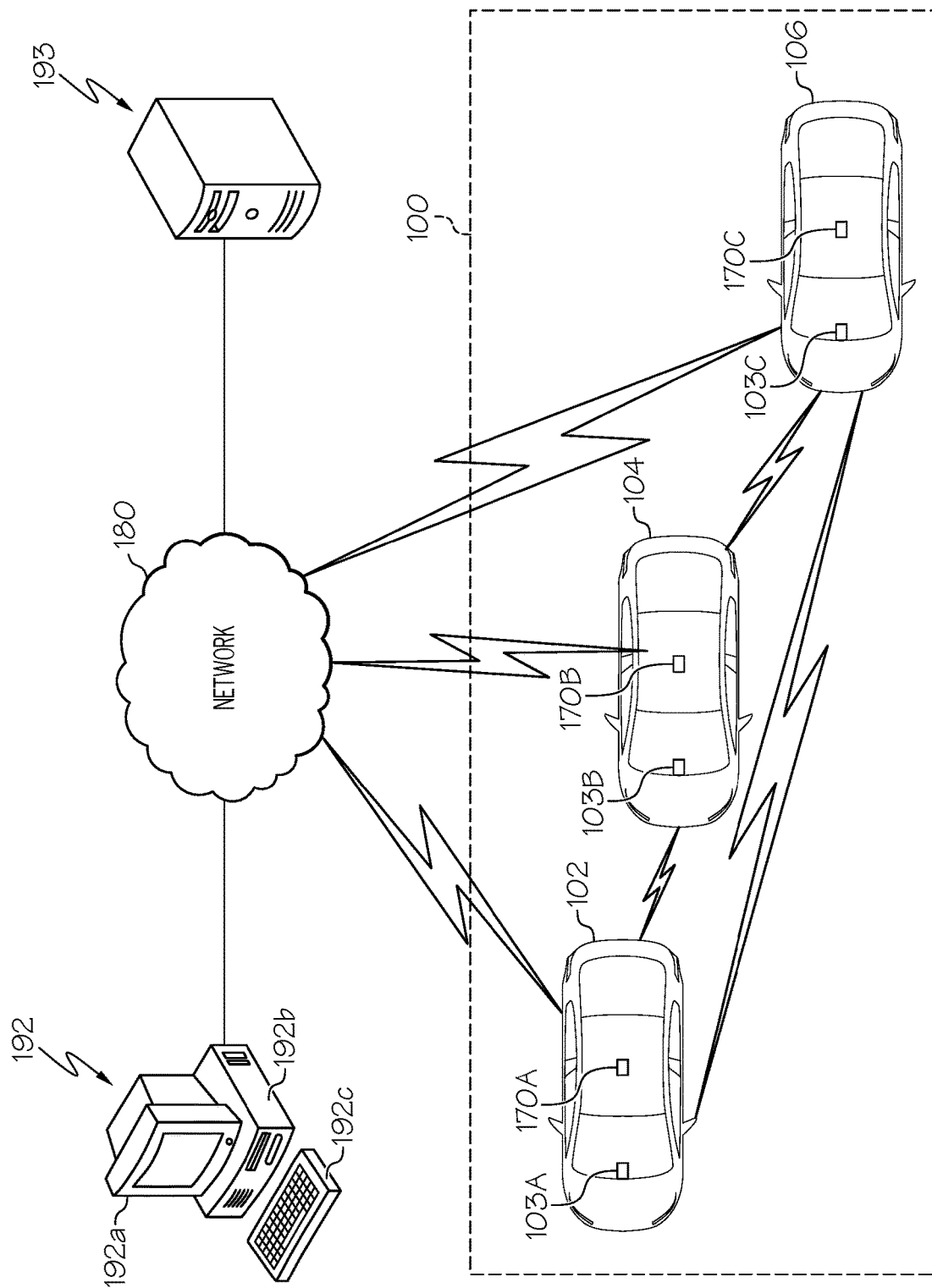
FIG. 3 depicts an illustrative embodiment of a system for selecting a desired network interface for a mesh network system according to one or more embodiments shown and described herein.

Referring now to FIG. 3 with reference to FIGS. 1 and 2, an illustrative embodiment of a system 300 for communicating with vehicles within the mesh network system 100. In some embodiments, communication between the first vehicle 102, the second vehicle 104, and the third vehicle 106 may be direct between each other. That is, the first vehicle 102 may communicate directly with the second vehicle 104 and/or the third vehicle 106, the second vehicle 104 may communicate directly with the first vehicle 102 and/or the third vehicle 106, and the third vehicle 106 may communicate directly with the first vehicle 102 and/or the second vehicle 104. In some embodiments, the first vehicle 102, the second vehicle 104 and/or the third vehicle 106 may communicate with each other through a network 180. In yet some embodiments, the first vehicle 102, the second vehicle 104 and/or the third vehicle 106 may communicate with one or more computing devices 192 and/or servers 193.

The network 180 may include one or more computer networks (e.g., a personal area network, a local area network, or a wide area network), cellular networks, satellite networks and/or a global positioning system and combinations thereof. Accordingly, the vehicles 102, 104 and 106 and the computing device 192 and/or server 193 may be communicatively coupled to each other through the network 180 via wires or wireless technologies, via a wide area network, via a local area network, via a personal area network, via a cellular network, via a satellite network, or the like. Suitable local area networks may include wired Ethernet and/or wireless technologies such as, for example, Wi-F). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, C-V2X, and GSM.

In particular, FIG. 3 depicts a first vehicle 102 having an electronic control unit 130A and a communications unit 170A, a second vehicle 104 having an electronic control unit 130B and a communications unit 170B, and a third vehicle having an electronic control unit 130C and a communications unit 170C. As descried in more detail herein, each of the vehicles, for example, the first vehicle 102, the second vehicle 104, and the third vehicle 106, when in range of each other, may share their speed, heading, position, destination information or the like with each other or the computing device 192.

The computing device 192 may include a display 192a, a processing unit 192b and an input device 192c, each of which may be communicatively coupled together. The processing unit 192b may include may include a processor, input/output hardware, network interface hardware, a data storage, and a memory component. The server 193 may have a similar configuration as the computing device 192, but configured to operate more strictly as a data storage and application support device.

The processor may include any processing component(s) configured to receive and execute instructions (such as from the data storage component and/or memory component). The instructions may be in the form of a machine-readable instruction set stored in the data storage component and/or the memory component. The input/output hardware may include a monitor, keyboard, mouse, printer, camera, microphone, speaker, and/or other device for receiving, sending, and/or presenting data. The network interface hardware may include any wired or wireless networking hardware, such as a modem, LAN port, Wi-Fi card, WiMax card, mobile communications hardware, and/or other hardware for communicating with other networks and/or devices.

It should be understood that the data storage component may reside local to and/or remote from the computing device 192 and may be configured to store one or more pieces of data such as a routing table, updates for vehicle systems, or the like for access by the computing device 192 and/or other components. It is understood that the server 193 may also be configured to store one or more pieces of data such as a routing table, updates for vehicle systems, or the like for access by the computing device 192 and/or vehicles via the network 180. It is noted that the computing device 192 and/or the serve server 193 may comprise electronic control devices.

A computing device 192 and/or an electronic control unit 130 may then use the speed, heading, position, and/or destination information, also referred to herein as traveling parameters, to determine relationships between the vehicles and identify vehicles that may form a mesh network based on their traveling parameters. Once a mesh network is established by the computing device 192 or the electronic control unit 130, a master node vehicle (e.g., vehicle 102) may be identified and utilized as an access point for other vehicles (e.g., vehicle 104) in the mesh network system 100 to communicate with the computing device 192, the server 193, or other devices via the WAN (e.g., the network 180).

As described herein, the mesh network system 100 may include the first vehicle 102, the second vehicle 104, the third vehicle 106, and/or other vehicles, where each vehicle acts as a node. Moreover, each communications unit 170A, 170B, 170C of the respective vehicles may include network interfaces for a plurality of different networks, protocols, or the like. For instance, each communications unit 170A, 170B, 170C may include one or more antennas (e.g., many in/many out (MIMO) antennas, etc.) that may allow for communication via Wi-Fi networks, IrDA, Bluetooth, Wireless USB, Z-Wave, ZigBee, near field communication (NFC), LTE, WiMAX, UMTS, CDMA, C-V2X, GSM interfaces may include Wi-Fi, $x^{th}$ generation cellular technology (e.g., 2G, 3G, 4G, 5G, etc.), WCDMA, LTE Advanced, or the like. The electronic control units 130A, 130B, 130C and/or the computing device 192 or the servers 193 may be configured to calculate radio metrics for communications between the vehicles or the communications unit 170A, 170B, 170C over the plurality of network interfaces. In examples, an abstraction layer 172 may transmit a request packet to each node within the mesh network system 100 via communications unit 170, where the request packet includes an airtime radio metric. Each receiving vehicle or relay node (e.g., second vehicle 104, third vehicle 106, etc.) may add, via their own abstraction layer 172, an airtime radio metric for the upcoming wireless link to the existing value of the airtime radio metric in the request packet such that an accumulated radio metric value may be determined. In examples, each abstraction layer 172 may select a network interface having a lowest airtime radio metric. The nodes/vehicles within the mesh network system 100 may iterate receiving a request and calculating a radio metric until a destination or terminal node receives the request. The destination node may then calculate a final route and network interface type for communications between each node. The destination node may then transmit a response packet that may notify each relay node of the selected route and selected network interface. As identified herein, the abstraction layer 172 may thus select a network interface between nodes with the lowest radio metric value for communications between nodes, without biasing towards any one network interface. It is noted that a network interfaces may or may not be an ideal network interface for communications between two different nodes. For instance, communications between the first vehicle 102 and the second vehicle 104 may utilize a first radio metric which has a first airtime radio metric score, while communications between the first vehicle 102 and the third vehicle 106 may utilize a second radio metric which has a second airtime radio metric score.

In particular, FIG. 3 depicts a first vehicle 102 having an electronic control unit 130A and a communications unit 170A, a second vehicle 104 having an electronic control unit 130B and a communications unit 170B, and a third vehicle having an electronic control unit 130C and a communications unit 170C. In embodiments described herein, an electronic control unit may act as an initiating electronic control unit (e.g., initiating node) which transmits an initial request, a relay electronic control unit (e.g., relay node) which receives a request and transmits to another relay node or a destination node, or a destination electronic control unit (e.g., destination node) which is a target for a request. As descried in more detail herein, each of the vehicles, for example, the first vehicle 102, the second vehicle 104, and the third vehicle 106, when in range of each other, may share their speed, heading, position, destination information or the like with each other or the computing device 192.

The computing device 192 may include a display 192a, a processing unit 192b and an input device 192c, each of which may be communicatively coupled together. The processing unit 192b may include may include a processor, input/output hardware, network interface hardware, a data storage, and a memory.

Figure 4:
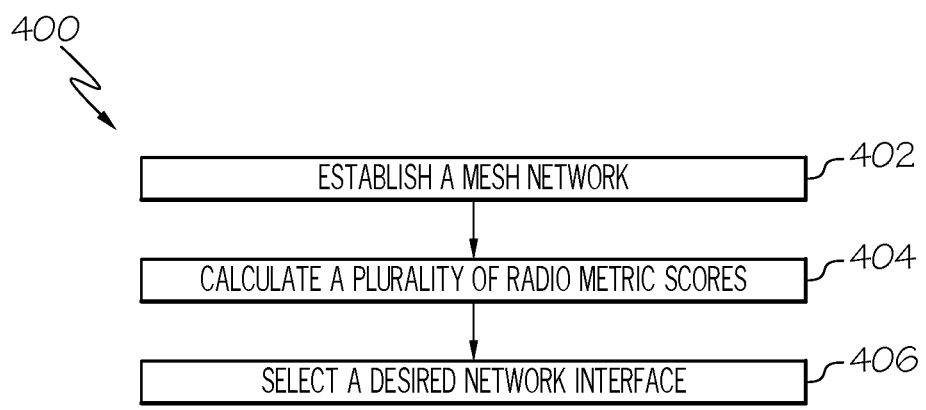
FIG. 4 depicts a flowchart of an example method for selecting a desired network interface and route for communications for a mesh network system according to one or more embodiments shown and described herein.

In view of the subject matter described herein, methods that may be related to various embodiments may be better appreciated with reference to the flowchart of FIG. 4. While the method is shown and described as a series of blocks, it is noted that associated methods or processes are not limited by the order of the blocks. It is further noted that some blocks and corresponding actions may occur in different orders or concurrently with other blocks. Moreover, different blocks or actions may be utilized to implement the methods described hereinafter. Various actions may be completed by a mesh network system or components thereof, such as the computing device 192 and/or an electronic control unit 130 (e.g., FIGS. 2-3), or the like.

FIG. 4 depicts a flowchart 400 of an example method for selecting a desired network interface and route for communications within a mesh network system. The flowchart 400 depicted in FIG. 4 is a representation of a machine-readable instruction set stored in the non-transitory computer readable memory 134 and executed by the processor 132 of an electronic control unit 130 or a processing unit 192b of a computing device 192. The process of the flowchart 400 in FIG. 4 may be executed at various times and intermittently repeated (e.g., every minute, five minutes, etc.) to confirm membership of vehicles to a mesh network.

At block 402, the method may establish a mesh network. In embodiments, a mesh network system (e.g., via a computing device 192 and/or an electronic control unit 130), may establish the mesh network between a plurality of vehicles. Each vehicle of the plurality of vehicles includes a communications unit comprising a plurality of network interfaces. The mesh network system may identify vehicles to be included in the mesh network based on vehicle travel characteristics, such as position information (e.g., a current position of vehicles, a target or anticipated future position or destination of vehicles, vehicle speeds, vehicle headings, vehicle proximity, or the like). In examples, the mesh network system may receive data from the plurality of vehicles based on vehicle sensors. According to some embodiments, the mesh network system may receive travel characteristics from remote computing devices, GPS systems, or the like. In some embodiments, the mesh network identifies and/or generates a mesh network including one or more vehicles based on: (i) a comparison of the current positions of the vehicles and (ii) a comparison of the future positions of the vehicles. For instance, vehicles with similar current positions and similar future positions may be selected for a mesh network. Similar current positions and similar future positions may be vehicles within a predetermined range of each other and/or have a similar heading and speed, or the like.

At block 404, the method may calculate a plurality of radio metric scores. In examples, the mesh network system may calculate radio metric scores for each of the plurality of network interfaces for a first vehicle of the plurality of vehicles. Calculating the a plurality of radio metric scores may include calculating radio metric scores for a plurality of network interfaces for a first vehicle of a plurality of vehicles of a mesh network as a function of radio metrics in a current motion state of the first vehicle, wherein the radio metrics indicate performance of the plurality of radio network interfaces in a current motion state of the first vehicle. In embodiments, the radio metric may comprise an airtime metric. The airtime metric may comprise the time taken for a packeted transmission on a wireless network to be sent and received. For instance, the mesh network system may determine airtime for each radio network interface by identifying a vehicle as a master node vehicle (e.g., control node vehicle, requesting node vehicle, etc.). The airtime radio metric may be a cumulative metric that reflects the total time required to transmit a unit test packet from one node to another node over a given network interface.

At block 406, the method may select a desire network interface. For example, the mesh network system may select a desired network interface from the plurality of network interfaces comprising a radio metric score having a desired radio metric score indicative of a desired performance in the current motion state. Moreover, the mesh network system may transmit a request packet from a first vehicle of the plurality of vehicles, wherein the request packet includes a request radio metric score. The request radio metric score may comprise the cumulative radio metric score from each prior node. This may include cumulative radio metric scores from the master node and any relay nodes (e.g., intervening nodes, intermediate nodes, etc.). In at least some embodiments, the request radio metric score may include cumulative scores for a plurality of network interfaces. For example, the request radio metric score may include a Wi-Fi radio metric score, an LTE radio metric score, DSRC radio metric score, C-V2X radio metric score, and/or the like. In other examples, the request radio metric score may include a radio metric score for only one radio network. For instance, the mesh network system may transmit different request packets for each radio network, where each request packet includes a radio metric score for a select network interface.

In some embodiments, the mesh network system may iterate receiving the request packet by the plurality of vehicles, selecting a selected network interface of the plurality of network interfaces have a desired radio metric, calculating an updated radio metric score as a function of the request radio metric score and a radio metric score of the selected network interface, and transmitting the request packet with the updated radio metric score. The mesh network system may trigger the iterating in response to a triggering event. The triggering event may comprise at least one of a change in an environmental factor, a passage of a time interval, or a change to the plurality of vehicles. For example, the mesh network may select time intervals based on a motion state of the plurality of vehicles, which may be determined based on signals from vehicle sensors (e.g., vehicle sensor(s) 150, FIG. 2-3). The vehicle sensor may be configured to generate a sensor signal that is indicative of a vehicle speed, a vehicle movement, a vehicle proximity to other vehicles, or a combination thereof. The current motion state may be selected from a plurality of predefined motion states, such as at least one of a stationary motion state, a non-stationary motion state, a range of speed based motion state, driving pattern motion state, or a proximity to other vehicles motion state. According to at least some embodiments, motion states may be identified for a set of vehicles having similar motion states. In another aspect, motion states may be determined based on artificial intelligence, statistical models, or other processes and/or algorithms to determine or adjust motion state classifications (e.g., determine patterns, adjust speed thresholds, etc.). In some embodiments, the motion state may be determined or calculated based on vehicle travel characteristics, such as position information, or the like. In at least some embodiments, the mesh network system may determine the current motion state based on a vehicle sensor signal received from a vehicle sensor (e.g., vehicle sensor(s) 150, FIG. 2-3). The vehicle sensor may be configured to generate a sensor signal that is indicative of a vehicle speed, a vehicle movement, a vehicle proximity to other vehicles, or a combination thereof. The current motion state may be selected from a plurality of predefined motion states, such as at least one of a stationary motion state, a non-stationary motion state, a range of speed based motion state, driving pattern motion state, or a proximity to other vehicles motion state. According to at least some embodiments, motion states may be identified for a set of vehicles having similar motion states. In another aspect, motion states may be determined based on artificial intelligence, statistical models, or other processes and/or algorithms to determine or adjust motion state classifications (e.g., determine patterns, adjust speed thresholds, etc.).

Additionally or alternatively, the mesh network system may receive, by a destination vehicle of the plurality of vehicles, the request packet. The request packet may include the update radio metric score. In examples, radio metric scores for the destination node may be added to the update radio metric score. As described herein, the destination node may receive radio metric scores for a plurality of network interfaces.

According to embodiments, the mesh network system may determine a final route and network interface type for communications between each of the plurality of vehicles. It is noted that the destination vehicle (e.g., via an electronic control unit), a computing device, a master node vehicle (e.g., via an electronic control unit), or the like may determine a final route. In an example, the destination vehicle may return or otherwise transmit a response packet that may notify each relay node of the selected route and selected network interface. As identified herein, network interfaces between nodes may be selected without weighting or biasing, such that a network interface having a lowest radio metric value for communications between nodes is selected. In some examples, a single network interface may be selecting. In other examples, multiple network interface may be selected, and different sets of nodes may communicate via different network interfaces.

The functional blocks and/or flowchart elements described herein may be translated onto machine-readable instructions. As non-limiting examples, the machine-readable instructions may be written using any programming protocol, such as: descriptive text to be parsed (e.g., such as hypertext markup language, extensible markup language, etc.), (ii) assembly language, (iii) object code generated from source code by a compiler, (iv) source code written using syntax from any suitable programming language for execution by an interpreter, (v) source code for compilation and execution by a just-in-time compiler, etc. Alternatively, the machine-readable instructions may be written in a hardware description language (HDL), such as logic implemented via either a field programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

Accordingly, described embodiments provide systems and methods for selecting network interfaces based on desired performances of a mesh network. In particular, a mesh network system includes an electronic control unit and/or computing device. The electronic control unit is configured to calculate a plurality of radio metric scores for a plurality of network interfaces for a first vehicle of a plurality of vehicles of a mesh network as a function of radio metrics in a current motion state of the first vehicle. The radio metrics indicate performance of the plurality of network interfaces in the current motion state of the first vehicle. The electronic control unit is further configured to select a desired network interface from the plurality of network interfaces comprising a desired radio metric score indicative of a desired performance in the current motion state.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A mesh network system comprising an electronic control unit configured to:
    calculate a plurality of radio metric scores for a plurality of network interfaces for a first vehicle of a plurality of vehicles of a mesh network as a function of radio metrics in a current motion state of the first vehicle, wherein the radio metrics indicate performance of the plurality of network interfaces in the current motion state of the first vehicle;
    select a desired network interface from the plurality of network interfaces comprising a desired radio metric score indicative of a desired performance in the current motion state; and
    iterate calculating the plurality of radio metric scores for each of the plurality of network interfaces for the first vehicle of the plurality of vehicles, and selecting the desired network interface from the plurality of network interfaces based on the plurality of radio metric scores in response to a triggering event, wherein the triggering event is a passage of a period of time or a change to a motion state of a vehicle.

2. The mesh network system of claim 1, wherein the plurality of network interfaces comprises a Wi-Fi network interface, a cellular network interface, or a vehicle to vehicle network interface.

3. The mesh network system of claim 2, wherein the electronic control unit is further configure to select the desired network interface based on an equally weighted scale for the plurality of network interfaces, such that selection is not biased to a single network interface of the plurality of network interfaces.

4. The mesh network system of claim 1, wherein the electronic control unit determines the period of time based on at least one of a motion state of a vehicle, an environmental factor, or a proximity of the first vehicle to at least one other of the plurality of vehicles.

5. The mesh network system of claim 1, wherein the plurality of radio metric scores comprises an airtime radio metric score.

6. The mesh network system of claim 1, further comprising a vehicle sensor communicatively coupled to the electronic control unit, wherein the vehicle sensor comprises at least one of a vehicle speed sensor, a motion sensors, or a proximity sensor.

7. The mesh network system of claim 1, wherein the electronic control unit is configured as at least one of a source electronic control unit, a relay electronic control unit, or a destination electronic control unit, wherein
    in response to the electronic control unit being configured as the source electronic control unit, the electronic control unit is further configured to transmit a request packet to a second vehicle of the plurality of vehicles;
    in response to the electronic control unit being configured as the relay electronic control unit, the electronic control unit is further configured to receive the request packet, calculate relay node radio metric scores for the plurality of network interfaces, and transmit the request packet to the second vehicle; and
    in response to the electronic control unit being configured as the destination electronic control unit, the electronic control unit is further configured to is configured to receive the request packet, and calculate a final route.

8. A mesh network system, comprising:
    a computing device configured to:
        calculate a plurality of radio metric scores for a plurality of network interfaces for a first vehicle of a plurality of vehicles of a mesh network as a function of radio metrics in a current motion state of the first vehicle, wherein the radio metrics indicate performance of the plurality of network interfaces in the current motion state of the first vehicle;
        select a desired network interface from the plurality of network interfaces comprising a desired radio metric score indicative of a desired performance in the current motion state;
        select a time interval for calculating the plurality of radio metric scores for the plurality of network interfaces, wherein the time interval is based at least in part on the current motion state; and
        select a stationary time interval as the time interval when the current motion state is identified as stationary or below a threshold speed.

9. The mesh network system of claim 8, wherein the electronic control unit is further configured to select a non-stationary time interval as the time interval when the current motion state is identified as above the threshold speed.

10. The mesh network system of claim 9, wherein the stationary time interval is greater than the non-stationary time interval.

11. The mesh network system of claim 8, wherein the stationary time interval is one minute or greater.

12. A method comprising:
    calculating, by a computing device, a plurality of radio metric scores for a plurality of network interfaces for a first vehicle of a plurality of vehicles of a mesh network as a function of radio metrics in a current motion state of the first vehicle, wherein the radio metrics indicate performance of the plurality of network interfaces in the current motion state of the first vehicle;
    selecting a desired network interface from the plurality of network interfaces comprising a desired radio metric score indicative of a desired performance in the current motion state;
    triggering the calculating the plurality of radio metric scores in response to a triggering event; and
    selecting a time interval based on a motion state of the plurality of vehicles;
    wherein the triggering event comprises at least one of a change in an environmental factor, a passage of the time interval, or a change to the plurality of vehicles.

* * * * *

UNITED STATES PATENT AND TRADEMARK OFFICE
CERTIFICATE OF CORRECTION

PATENT NO. : 11,689,984 B2
APPLICATION NO. : 17/219001
DATED : June 27, 2023
INVENTOR(S) : Shingo Sugimoto and Osamu Kawakami It is certified that error appears in the above-identified patent and that said Letters Patent is hereby corrected as shown below:

On the Title Page

Column 2, item (56), other publications, cite no. 1, delete "Miariem Thaalbi, et al." and insert --Mariem Thaalbi, et al.--, therefor.

In page 2, Column 1, item (56), other publications, cite no. 2, delete "Key features and Not just 4X Throughput'." and insert --'Key features and Not just 4X Throughput'.--, therefor.

In page 2, Column 1, item (56), other publications, cite no. 4, delete "'IEEE 802.11s Wireless LAN Mesh Network Technology." and insert --'IEEE 802.11s Wireless LAN Mesh Network Technology'.--, therefor.

In the Specification

In Column 5, Line(s) 63, delete "severs" and insert --servers--, therefor.

In Column 5, Line(s) 66, delete "severs" and insert --servers--, therefor.

In Column 7, Line(s) 28, delete "⅝ mile" and insert --¾ mile--, therefor.

In Column 10, Line(s) 7, delete "may include may include" and insert --may include--, therefor.

In Column 11, Line(s) 24, after "a network", delete "interfaces" and insert --interface--, therefor.

In Column 11, Line(s) 52, delete "may include may include" and insert --may include--, therefor.

In Column 12, Line(s) 42, after "the", delete "a".

In Column 12, Line(s) 59, before "network", delete "desire" and insert --desired--, therefor.

Signed and Sealed this
Twenty-ninth Day of August, 2023

Katherine Kelly Vidal
*Director of the United States Patent and Trademark Office*

In the Claims

In Column 15, Line(s) 31, Claim 3, after "further", delete "configure" and insert --configured--, therefor.

In Column 16, Line(s) 7, Claim 7, delete "is configured to".